US008980091B2

(12) United States Patent
Fabiyi

(10) Patent No.: US 8,980,091 B2
(45) Date of Patent: Mar. 17, 2015

(54) OXYGEN CONTROL SYSTEM AND METHOD FOR WASTEWATER TREATMENT

(71) Applicant: Malcolm E. Fabiyi, Chicago, IL (US)

(72) Inventor: Malcolm E. Fabiyi, Chicago, IL (US)

(73) Assignee: Praxair Technology, Inc., Danbury, CT (US)

(*) Notice: Subject to any disclaimer, the term of this patent is extended or adjusted under 35 U.S.C. 154(b) by 135 days.

(21) Appl. No.: 13/888,580

(22) Filed: May 7, 2013

(65) Prior Publication Data

US 2014/0332464 A1    Nov. 13, 2014

(51) Int. Cl.
 *C02F 3/00*   (2006.01)

(52) U.S. Cl.
 CPC ...................... *C02F 3/006* (2013.01)
 USPC ........... 210/614; 210/620; 210/626; 210/739; 210/150; 210/151; 210/220; 210/195.3

(58) Field of Classification Search
 None
 See application file for complete search history.

(56) References Cited

U.S. PATENT DOCUMENTS 6,273,402 B1    8/2001   Cheng

OTHER PUBLICATIONS

Palm et al., "Relationship between organic loading, dissolved oxygen concentration and sludge settleability in the completely-mixed activated sludge process", Journal WPCF, vol. 52, No. 10, 1980, pp. 2484-2506.

*Primary Examiner* — Chester Barry
(74) *Attorney, Agent, or Firm* — Donald T. Black

(57) ABSTRACT

A method and system for controlling dissolved oxygen levels in a secondary treatment system of a wastewater treatment facility that can employ a membrane bioreactor in which oxygen introduction into mixed liquor is controlled to prevent bulking and minimize generation of extra cellular polymeric substances. The control is exercised by insuring that dissolved oxygen levels within the mixed liquor do not fall below a minimum system level at which microorganism stress would occur. This is done by setting a minimum dissolved oxygen level control point equal to a sum of the minimum system level and an adjustment factor determined on the basis of oxygen uptake rate and time delays inherent in sensing oxygen levels and changes thereof within the mixed liquor. The minimum system dissolved oxygen level can be continually calculated on the basis of an inferred food to mass ratio that would vary with sensed mixed liquor suspended solids.

12 Claims, 2 Drawing Sheets

OXYGEN CONTROL SYSTEM AND METHOD FOR WASTEWATER TREATMENT

FIELD OF THE INVENTION

The present invention relates to a method and system for controlling dissolved oxygen levels in a secondary treatment system within a waste water treatment facility to prevent bulking and minimize generation of extracellular polymeric substances. More particularly, the present invention relates to such a method and system in which introduction of oxygen into an aeration basin of the secondary treatment system is controlled to attain a dissolved oxygen level above a minimum system dissolved oxygen level at which bulking and polymeric substance generation would otherwise occur and that is adjusted for instrumentation and measurement delays.

BACKGROUND OF THE INVENTION

Wastewater treatment facilities typically utilize naturally-occurring microorganisms to remove dissolved or suspended biological matter from the wastewater to be treated. Typically such facilities include primary, secondary and tertiary treatment systems. Initially, in the primary treatment system, the wastewater is held in a clarifier to allow the heavier solids to settle to the bottom of the basin and lighter materials to rise to the surface. The heavier solids and lighter materials are thereby separated in the primary treatment system and the wastewater removed from such a system can be introduced into the secondary treatment system where the microorganisms can act to remove the remaining biological matter. The effluent from the secondary treatment system is further treated in a tertiary treatment system to make the effluent from the secondary treatment system suitable for discharge into the environment by denitrification and removal of phosphorous, suspended matter, color, etc.

In a secondary treatment system utilizing activated sludge, the effluent from the primary treatment system is introduced into an aeration basin along with oxygen to support bacterial activity. The effluent from the aeration basin is then introduced into a clarifier tank or a series of such tanks or a membrane bioreactor. A return sludge stream is recycled from the clarifier or membrane bioreactor back to the aeration basin to provide some of the bacterial activity within the aeration basin. In a clarifier, the sludge settles to the bottom of the tank and the return sludge stream is circulated from such a tank or basin back to the aeration basin. In a membrane bioreactor the mixed liquor is forced through a porous membrane that has pores to allow the effluent to be filtered to produce a permeate which can be discharged, or sent for further processing and a retentate from which the return activated sludge stream is recirculated back to the aeration basin. Further aeration and oxygen addition may be present within such a reactor to prevent fouling of the membrane.

It is to be noted that membrane bioreactor use is growing in water and wastewater treatment because such systems provide higher quality effluent and can be operated at higher mixed liquor suspended solids concentrations than conventional, gravity based secondary clarification processes. The ability to operate at higher mixed liquor suspended solids concentration allows for a smaller footprint of the wastewater treatment system and can result in lower capital costs and energy requirements. In conventional wastewater treatment processes using gravity settling clarifiers, the level of mixed liquor suspended solids is limited by the surface overflow rate of the clarifier and the solids loading rate to the clarifier. A membrane bioreactor has no such limitation to its solids loading capacity and therefore, such bioreactors can be operated at higher solids loadings than conventional secondary clarifiers. However, fouling is a major issue with membrane bioreactor systems because such fouling will reduce membrane flux and permeability, and increase the energy consumed by the membrane. Fouling also leads to an increase in the frequency of cleaning required to obtain an acceptable flux. Fouling can be a result of extracellular polymeric substances that are routinely released by biological cells in an activated sludge process. Such substances consist mainly of a mixture of proteins, polysaccharides, lipids, nucleic acids and humic compounds. Microorganism stress will increase the release of such substances. Additionally, such stress will also lead to the formation of filamentous microorganism growth or bulking which is also a source of fouling. It is to be mentioned, however, that the production of extracellular substances and bulking is also a problem in conventional secondary clarifiers because such formation will have an effect on the clarifier effluent and therefore, overall system performance.

Low dissolved oxygen levels within the mixed liquor of the aeration basin are a source of microorganism stress that can lead to the production of extracellular substances and bulking In accordance with the present invention, the oxygen addition into the aeration basin is controlled to prevent such microorganism stress. However, the control of dissolved oxygen levels within the aeration basin is not completely straightforward because the flow of effluent passing through the secondary treatment system can vary as a result of many known factors, for instance fluctuations in water usage, varying organic loads in the influent flow and increased flows produced by run-off. Moreover, instrumentation that is used will often not accurately reflect the level of dissolved oxygen within the mixed liquor contained in the aeration basin.

As will be discussed, the present invention provides a method and system for introducing oxygen into an aeration basin of a secondary treatment system which among other advantages provides a high degree of assurance that the dissolved oxygen will not fall to a level that is sufficiently low to cause stress in the bacterial environment and resulting in bulking and formation of extra cellular polymeric substances.

SUMMARY OF THE INVENTION

The present invention provides a method of controlling dissolved oxygen levels in a secondary treatment system of a wastewater treatment facility to prevent bulking and minimize generation of extra cellular polymeric substances. In accordance with such method, oxygen is introduced into mixed liquor contained in an aeration basin of the secondary treatment system to support bacterial activity within the aeration basin that is provided in part by return activated sludge. A dissolved oxygen concentration is measured within the mixed liquor with an oxygen sensor having a response time equal to a time delay between measurement of the dissolved oxygen and a change in the oxygen injection rate. An oxygen uptake rate at which the oxygen is consumed in the mixed liquor is multiplied by the response time to obtain a dissolved oxygen adjustment factor and a minimum dissolved oxygen set point is calculated by adding the dissolved oxygen adjustment factor to a minimum system dissolved oxygen concentration selected to prevent bulking and minimize generation of extra cellular polymeric substances. The oxygen introduction into the mixed liquor is controlled so that the dissolved oxygen concentration is within a range of the minimum dissolved oxygen set point and a maximum dissolved oxygen set point that is less than the solubility limit of the dissolved oxygen within the mixed liquor.

Preferably, a level of mixed liquor suspended solids is measured with a suspended solids sensor located within the aeration basin. The minimum system dissolved oxygen concentration is calculated from data that relates at least the level of mixed liquor suspended solids, as measured by the suspended solids sensor, to minimum system dissolved oxygen concentration values referable to inferred food to mass rations that will prevent bulking and minimize generation of extra cellular polymeric substances. The minimum system dissolved oxygen concentration is continually updated from the minimum system dissolved oxygen concentration values contained within the data and based at least upon the level of mixed liquor suspended solids as measured by the suspended solids sensor.

A target dissolved oxygen set point can be calculated from an arithmetic average of the maximum dissolved oxygen set point and the minimum dissolved oxygen set point. When the oxygen concentration as measured by the oxygen sensor is above the target dissolved oxygen set point, the oxygen introduction into the mixed liquor is suspended, a rate of change of the dissolved oxygen concentration as measured by the sensor is calculated and the oxygen uptake rate is set equal to the rate of change of the dissolved oxygen concentration. When the oxygen concentration as measured by the oxygen sensor is below the target dissolved oxygen set point, the oxygen introduction into the mixed liquor is controlled so that the oxygen concentration as measured by the oxygen sensor at least approaches the target dissolved oxygen set point.

In any embodiment of the present invention, the secondary treatment system can have a membrane bioreactor. An effluent stream from the aeration basin is introduced into a membrane bioreactor to separate the solid content therefrom and thereby to produce activated sludge as a retentate. In such case, the return activated sludge is produced by introducing a return activated sludge stream from the membrane bioreactor to the aeration basin. The prevention of bulking and minimization of the generation of extra cellular polymeric substances in turn reduces fouling of membranes within the membrane bioreactor. Additionally, the oxygen can be introduced into the mixed liquor by introducing an oxygen stream into a headspace of a ballast chamber of a mixing device having a draft tube connected to the ballast chamber and an impeller driven within the draft tube to draw the mixed liquor into one end of the draft tube along with the oxygen and to expel a resulting liquid gas mixture from the other end of the draft tube. The oxygen injection is controlled by a remotely activated valve situated between the headspace of the mixing device and a source of the oxygen stream.

Preferably, the maximum dissolved oxygen set point can be calculated by adding to the minimum dissolved oxygen set point a preselected dissolved oxygen value of between 1.0 and 5.0 milligrams/liter dissolved oxygen.

The present invention also provides a system for controlling dissolved oxygen levels in a secondary treatment system of a waste water treatment facility to minimize bulking and generation of extra cellular polymeric substances. The secondary treatment system has an aeration basin containing mixed liquor and a means for introducing oxygen into the mixed liquor. Such oxygen introducing means is responsive to an oxygen control signal to control the introduction of the oxygen into the mixed liquor. A means is also included for providing return activated sludge to the mixed liquor.

An oxygen sensor is located within the mixed liquor for generating a dissolved oxygen signal referable to a dissolved oxygen concentration within the mixed liquor. The oxygen sensor has a response time equal to a time delay between measurement of the dissolved oxygen and a change in the oxygen injection rate. The system includes a controller, responsive to the dissolved oxygen level signal, configured to generate the oxygen control signal. The controller has a control program that is programmed to periodically execute. During each execution of the control program, an oxygen uptake rate at which the oxygen is consumed in the mixed liquor is multiplied by the response time to obtain a dissolved oxygen adjustment factor. A minimum dissolved oxygen set point is calculated by adding the dissolved oxygen adjustment factor to a minimum system dissolved oxygen concentration selected to prevent bulking and minimize generation of extra cellular polymeric substances. The oxygen control signal is generated and the oxygen injection is thereby controlled so that the dissolved oxygen concentration, as measured by the oxygen sensor is no less than the minimum dissolved oxygen set point and no greater than a maximum dissolved oxygen set point that is less than a solubility limit of the dissolved oxygen within the mixed liquor.

A suspended solids sensor can be located within the aeration basin and configured to generate a suspended solids signal referable to a level of mixed liquor suspended solids. The controller is responsive to the suspended solids signal and the control program contains data that relates at least the level of mixed liquor suspended solids, as measured by the suspended solids sensor, to minimum system dissolved oxygen concentration values referable to inferred food to mass ratios that will prevent bulking and minimize generation of extra cellular polymeric substances. During each execution of the control program, the control program determines the minimum system dissolved oxygen concentration from the minimum system dissolved oxygen concentration values contained in the data and based upon at least the level of mixed liquor suspended solids.

In an embodiment of the present invention, the oxygen introducing means can be an oxygen introduction device configured to inject oxygen into the mixed liquor, a remotely activated control valve positioned between a source of the oxygen and the oxygen introduction device and a local controller responsive to the oxygen control signal and the dissolved oxygen signal. The local controller is configured to control a degree to which the remotely activated valve is opened and the flow of the oxygen so that the oxygen concentration as measured by the oxygen sensor at least approaches a target dissolved oxygen set point or alternatively, to close the control valve and suspend delivery of the oxygen to the mixed liquor. The control program is also programmed to calculate the target dissolved oxygen set point from an arithmetic average of the maximum dissolved oxygen set point and the minimum dissolved oxygen set point. The target dissolved oxygen set point with the dissolved oxygen concentration as measured by the oxygen sensor is compared within the control program. When the dissolved oxygen concentration as measured by the oxygen sensor is greater than the target dissolved oxygen set point, an oxygen control signal is generated so that the local controller closes the control valve, values of the dissolved oxygen concentration are stored; a rate of change in the dissolved oxygen concentration is calculated between a current value of the dissolved oxygen concentration and a past value of the dissolved oxygen concentration as measured by the oxygen sensor and the oxygen uptake rate variable is then set equal to the rate of change. Alternatively, when the dissolved oxygen concentration as measured by the oxygen sensor is less than the target dissolved oxygen set point, the oxygen control signal is generated to be referable to the target dissolved oxygen set point so that the oxygen concentration as measured by the oxygen sensor at least approaches the target dissolved oxygen set point.

The return activated sludge means can be a membrane bioreactor connected to the aeration basis to receive an effluent stream from the aeration basin and thereby to separate the solid content therefrom as a retentate. A recycle line connects the membrane bioreactor to the aeration basin so that a return activated sludge stream is returned to the aeration basin as the return activated sludge. The prevention of bulking and minimization of generation of extra cellular polymeric substances in turn reduces fouling of membranes within the membrane bioreactor. Further, the oxygen injection device can be of the type having a headspace located within of a ballast chamber, a draft tube connected to the ballast chamber, an impeller located in the draft tube and a motor connected to the impeller to drive the motor so that the mixed liquor is drawn into one end of the draft tube along with the oxygen from the headspace and a resulting liquid gas mixture is discharged from the other end of the draft tube. In such case, the remotely activated valve is situated between the headspace of the mixing device and a source of the oxygen stream to control flow of oxygen introduced into the headspace of the mixing device.

Preferably the control program calculates the maximum dissolved oxygen set point by adding to the minimum dissolved oxygen set point a preselected dissolved oxygen concentration value of between 1.0 and 5.0 milligrams/liter dissolved oxygen.

BRIEF DESCRIPTION OF THE DRAWINGS

While the specification concludes with claims distinctly pointing out the subject matter that Applicants regard as their invention, it is believed that the present invention will be better understood when taken in connection with the accompanying drawings in which:

DETAILED DESCRIPTION

Figure 1:
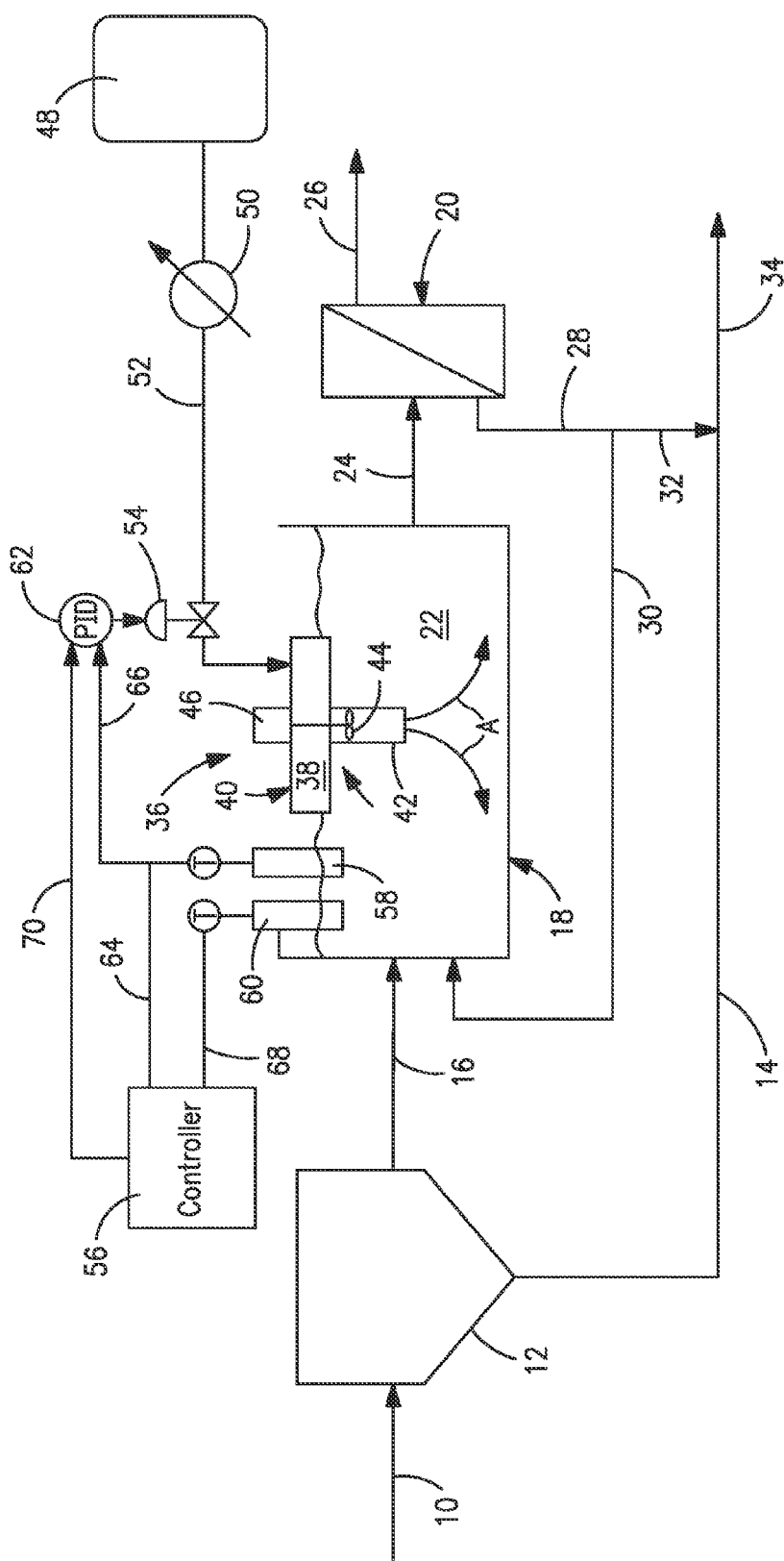
FIG. 1 is a fragmentary, schematic illustration of a waste water treatment facility utilizing a control system for carrying out a method in accordance with the present invention.

With reference to FIG. 1, a wastewater treatment facility 1 is illustrated in which an influent stream 10 is introduced into a primary clarifier 12 to allow separation between soluble organic materials, heavier and lighter solids. Such separation produces a primary sludge stream 14 containing the settled heavier solids. An effluent stream 16 from the primary clarifier 12 is introduced into a secondary treatment system having an aeration basin 18 and a membrane bioreactor 20. Microorganisms within the aeration basin 18 act to remove organic matter contained in mixed liquor 22 within the aeration basin 18. The treated effluent, as a stream 24, is introduced into the membrane bioreactor to separate microorganisms from the waste water and thereby produce a permeate effluent stream 26 and an activated sludge stream 28. The permeate effluent stream 26 can be discharged, or further processed in a tertiary system before being released into the environment. The activated sludge stream 28 is divided into a return activated sludge stream 30 that through a conduit is recirculated back to the aeration basin 18 supplying microorganisms that provide some of the biological activity occurring within such basin. A waste activated sludge stream 32 is combined with the primary sludge stream 14 to produce a sludge stream 34 for further processing in, for example, a thickener or digester.

It is to be noted that such separate membrane bioreactor 20 is not the only means of providing return activated sludge. For instance, the membranes instead of being in a separate reactor could be in the aeration basin 18. Vacuum would draw the mixed liquor 22 into the membranes and the retentate would circulate within the aeration basin 18. Also, a side stream of mixed liquor 22 could be passed through a membrane with activated sludge produced as retentate circulated back to the aeration basin 18. A yet further alternative is that in lieu of membrane bioreactor 20, the effluent could be introduced into clarifiers to settle out the suspended solid content for recirculation of return activated sludge back to the aeration basin 18.

The bacterial activity within the aeration basin 18 is supported by introduction of oxygen into the mixed liquor 22. This is accomplished in the present invention by a device 36. Oxygen injection device 36 has a headspace 38 located within a ballast chamber 40. A draft tube 42 is connected to the ballast chamber 40 and an impeller 44 located in the draft tube 42, driven by a motor 46, draws the mixed liquor 22 into one end of the draft tube 42 along with the oxygen from the headspace 38. Such a device is fully described in U.S. Pat. No. 6,273,402. Other types of devices, as well known in the art could be used for oxygenation, for instance spargers, submersible mixers or the pumping of a side stream of mixed liquor or influent through a pump. A resulting liquid gas mixture is discharged from the other end of the draft tube 42 as generally shown by arrowheads "A". The oxygen, which preferably has purity at above 70 percent, is supplied from a liquid tank 48. The liquid oxygen is vaporized in an atmospheric vaporizer 50 and flows as a stream through line 52 to the headspace 38. A control valve 54 is positioned between such oxygen source and the headspace 38 to control the flow of oxygen.

As mentioned above, the level of dissolved oxygen in the mixed liquor 22 and therefore, the rate of oxygen injection thereto, is critical in preventing bulking and minimizing the production of extracellular polymeric substances by the microorganisms. In this regard, the avoidance of bulking and minimization of the production of extracellular material is particularly critical in the case of membrane bioreactors such as designated by reference number 26. There exists a dissolved oxygen level at any particular food to mass ratio, known in the art as "F/M", that will be required to avoid bulking in any system. As will be discussed, the present invention provides a control system in which a dissolved oxygen level is maintained in the mixed liquor 22 to meet a specific system oxygen concentration level within the mixed liquor 22. Although such a specific system oxygen concentration level can be a fixed quantity, as will be discussed, it can be continually updated from data in which an F/M ratio is inferred from at least in part a measurement of mixed liquor suspended solids within the mixed liquor 22. In such case, the specific system oxygen concentration level is related to the resulting inferred F/M ratio with the use of either empirical data or data that has been experimentally developed for a particular activated sludge system. Suitable empirical data can be found in such works as the Relationship between Organic Loading, dissolved Oxygen Concentration and Sludge Settleability in the Completely-Mixed Activated Sludge Process, Palm et al., J. Water Pollut. Control Fed., 1980), pp. 52, 2484, See FIG. 2.

The control system of the present invention includes a controller 56, sensors 58 and 60 that measure dissolved oxygen and mixed liquor suspended solids within mixed liquor 22, respectively and a local control 62 that responds to targets generated by the controller 56 to control the opening of control valve 54. In this regard, the sensor 58 generates a dissolved oxygen signal that is referable to the dissolved oxygen level within the mixed liquor 22 and that is transmitted to controller 56 by means of a conductor 64 and local controller 62 by means of a conductor 66. Sensor 60 generates a mixed liquor suspended solids signal referable to the level of mixed liquor suspended solids within mixed liquor 22 and transmits the same to controller 56 by means of an electrical conductor 68. The targets generated by the controller 56 are contained in an oxygen control signal that is transmitted to the local controller 62 by means of an electrical conductor 70.

Figure 2:
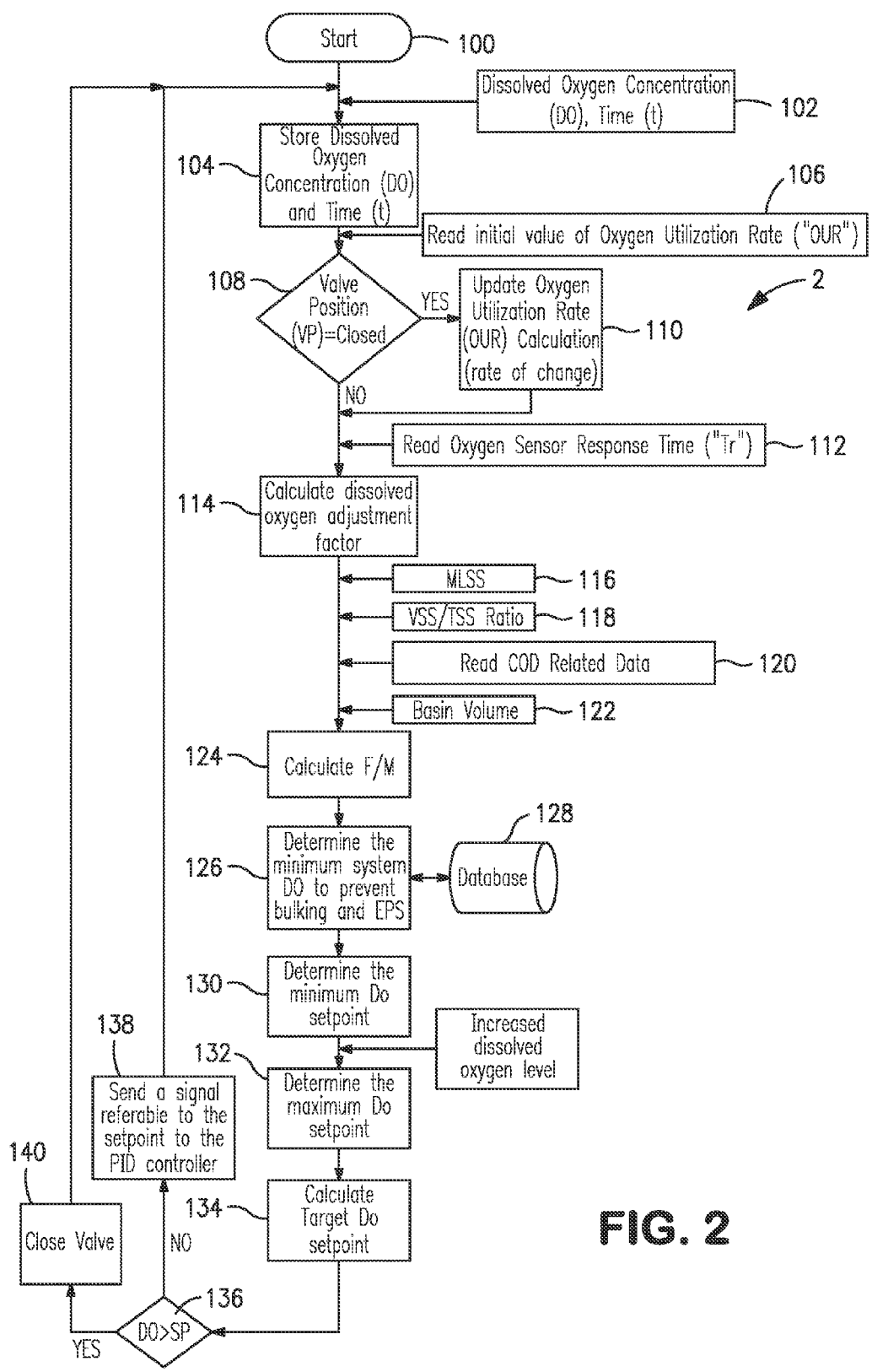
FIG. 2 is a diagram of logic employed within a control program used in a controller shown in FIG. 1.

With reference to FIG. 2, the logic incorporated into a control program 2 is shown of the type that would be programmed within controller 56. In this regard, controller 56 can be a programmable logic controller (PLC). The control program 2 continually executes at a repeating interval that can be approximately 5 minutes, or a frequency that matches the typical range of fluctuations in organic load at the wastewater facility. The program proceeds from the "Start" block 100 by receiving an input of a value of the dissolved oxygen concentration "DO" as measured by the sensor 58 and as indicated at the logic block designated by reference number 102. The value of "DO" is subsequently stored at 104.

The control program 2 then reads an initial value of the Oxygen Utilization Rate ("OUR") at 106. This value is stored within the control program 2. Thereafter, a test is performed at 108 to determine whether the control valve 54 is set in the closed position and therefore, no oxygen is being introduced into the mixed liquor 22. If the answer to the test is in the affirmative, the oxygen utilization rate is updated from either the initial value or a previously updated value as shown in logic stage 110. Although there are a variety of ways of performing such a computation, preferably, a previous value of the dissolved oxygen concentration "DO" stored at 104 is subtracted from a current reading at 102 and the difference is divided by the program execution time interval. If the answer to the test is in the negative, the oxygen utilization rate is not updated and either the previously updated value or the initial value thereof is used in calculations that will be described below.

A previously stored oxygen sensor response time ("Tr") is then read into the control program 2 at 112 and a dissolved oxygen adjustment factor is calculated at 114. The oxygen sensor response time is equal to a sum of a known time constant for the particular oxygen sensor used for oxygen sensor 58 and a dead time constant. Oxygen sensors do not immediately produce a signal or reading that is referable to the dissolved oxygen level in the mixed liquor 22. Rather, such a signal or reading is produced after the sensor has had time to react to a change in the dissolved oxygen level, for instance, 30 seconds. Additionally another time delay occurs, the "dead time" which is due to a delay between the introduction of the oxygen being introduced into the mixed liquor 22 by the device 36 and the oxygen reaching the oxygen sensor 58. As such any change in oxygen concentration in the mixed liquor due to an increase or decrease in the oxygen being introduced into the mixed liquor will only reach the oxygen sensor 58 after the dead time delay. This delay is of course specific to the aeration tank 18 and the method for the introduction of the oxygen that is actually used and therefore, is experimentally determined. In any event, in order to provide a correction for the delay or the response time "Tr", the response time is multiplied by the value of the "OUR" determined above to obtain the oxygen adjustment factor at 114. As will be discussed, this oxygen adjustment factor will be used in an additive manner to adjust the minimum system dissolved oxygen level that is used by the control program 2 to prevent bulking so that actual levels of dissolved oxygen within the mixed liquor 22 do not fall below such minimum level.

The minimum dissolved oxygen level could be adjusted by simply adding the oxygen adjustment factor to a minimum system dissolved oxygen level that is a conservative value that is simply a single input to the control program 2. A minimum dissolved oxygen set point would be determined from such adjustment. However, preferably, the minimum system dissolved oxygen level can be calculated at each execution of the control program 2 in which a food to mass ratio ("F/M") is inferred with the use of a data base in which the inferred value is related to the minimum system dissolved oxygen level that will avoid bulking and minimize generation of extra cellular polymeric substances. Such calculation is initiated, at 116, by reading in the current value of the mixed liquor suspended solids ("MLSS") that is produced by suspended solids sensor 60. Thereafter, at 118, data referable to a "VSS/TSS" ratio is also read into the control program 2 at 118. In this ratio, "VSS" is the volatile suspended solids and "TSS" is the total suspended solids. This ratio is an experimentally determined ratio and represents the fraction of the suspended solids within the mixed liquor that is made up by the microorganisms. Data related to the COD (chemical oxygen demand) to be removed and the influent flow 16 into the aeration basin 18 is then input from stored data into the control program at 120 and also the basin volume of the aeration basin 18 at 122. It is to be noted that the COD removed can be determined from a laboratory test using a spectrophotometer or other analytical means, in which COD levels within the influent 16 to the permeate effluent stream 26 are compared. This test can be periodically performed several times a day or weekly. In any event, the calculation of the inferred F/M within the logic block 124 can be reduced to a formula in which the inferred F/M is given by the formula:

$$(Q \times COD)/(V \times MLSS \times VSS/TSS);$$

where Q is the volumetric flow rate of influent 16 into the aeration basin 18, COD is the chemical oxygen demand to be removed experimentally determined as set forth above, V is the volume of the aeration basin 18, MLSS is the value measured by suspended solids sensor 60, and VSS/TSS is the experimentally determined ratio of volatile suspended solids and total suspended solids.

Hence, in the development of data in which F/M is inferred in accordance with the above equation, the "food" is being inferred from the volumetric flow rate times the chemical oxygen demand and the "mass" is being inferred from the basin volume times the suspended solids measurement proportioned by an experimentally determined ratio of volatile suspended solids and the total suspended solids ("VSS/TSS") that would be expected to be found in the particular treatment system. Assuming a constant flow rate the F/M would be therefore inferred from data that relates to a measured value of MLSS by suspended solids sensor 60. It is to be noted, that although not illustrated, flow rate of influent stream 16 could also be measured to take into account variable flow rates resulting from variable production of wastes and ground water.

Alternatively, a value for F/M may be inferred from the OUR determined above and the MLSS. In this regard, data containing a ratio of COD required to be removed divided by the oxygen required for such removal could be experimentally derived and read into the control program at 120. In such case, the F/M ratio would be inferred from the following formula:

(OUR×COD/Oxygen Required×Volume/percent COD removal)/(MLSS×Volume×VSS/TSS);

where "OUR" is the oxygen uptake rate, COD/Oxygen required is the reciprocal of the O2/COD ratio, which specifies how much Oxygen is required per unit of COD treated in the system, and the "percent removal" is the average value of the percentage of COD removed in the treatment system.

When F/M is inferred in such manner, the numerator is the inferred food and again, the denominator is the inferred mass. OUR would either be the initial value or an updated value determined in logic block 110. The values of COD and Oxygen required can be recalculated to improve accuracy from measurements taken of the system.

After the determination of F/M, the minimum system dissolved oxygen level is determined at 126 through access to a database 128 relating the minimum system dissolved oxygen to the inferred F/M as provided above that will prevent bulking and minimize generation of extra cellular polymeric substances. The minimum dissolved oxygen set point is then determined at 130 by adding to the minimum system dissolved oxygen, the oxygen adjustment factor determined at 114. The maximum dissolved oxygen set point is determined at 132 by simply adding a preselected value to the minimum dissolved oxygen set point that will set the maximum dissolved oxygen set point to a level that is no greater than the oxygen solubility limit. However, preferably, the value used will be no less than 1.0 and no greater than 5.0 mg/liter dissolved oxygen. The theory behind such range is that the maximum oxygen dissolution limit will never be exceeded and at the same time, the system will be closely controlled to prevent the dissolved oxygen level from ever falling below the minimum system dissolved oxygen level at which bulking and will occur. The exact value selected should be such that enables well defined DO profiles that are amenable to analysis for the determination of OUR to be obtained when the O2 supply valve 54 is modulated due to the controlling action of the controller 62. Thereafter, at logic stage 134, a target dissolved oxygen level is calculated which is preferably an arithmetic average of the minimum and maximum dissolved oxygen set points. A test is then performed at 136 at which the dissolved oxygen as measured by the oxygen sensor 58, "DO" is compared with the set point "SP" calculated at 134. If the answer is in the negative, as shown in logic stage 138, the oxygen signal generated by the control program 2 is referable to the target dissolved oxygen set point. On the other hand, if the answer is in the affirmative, then as indicated at 140, the oxygen signal generated by the control program 2 is generated to command the control valve 54 to close.

The oxygen control signal generated at 138 or 140 is then transmitted to a local controller 62 by means of electrical conductor 70. Local controller 62 as illustrated can be a proportional, integral and derivative controller ("PID") which will react to the oxygen control signal as a target to appropriately signal a motor driving the control valve 54 to adjust the opening of the valve in response to feed back provided by the signal generated by the oxygen sensor 58 that is fed to the local controller 62 by way of electrical connection 66. For instance, when the oxygen control signal is generated at 138, the local controller 62 will control the degree to which control valve 54 is opened to obtain a value of dissolved oxygen as measured by oxygen sensor 58 that at least approaches the target within a tolerance for instance by a few percent. On the other hand, when the oxygen control signal is generated at 140, the signal will be referable to for instance a dissolved oxygen level of zero and the control valve 54 will fully close.

There are of course other ways to close control valve 54 with the use of another separate output signal of the controller.

After the control action described above, the control program loops back to "Start" at 100 for another execution. At the subsequent execution, if the test performed at 108 indicated that the control valve 54 was previously set in a closed position, oxygen would be depleted without oxygen addition to the mixed liquor 22. At such time, a measurement of the oxygen utilization or uptake rate could then be determined.

It is to be noted that the control logic described above could be modified. For instance, the oxygen control signal generated by the controller could simply be one that instructs the control valve 54 to open if at or above the minimum dissolved oxygen set point and to close if at or above the maximum dissolved oxygen set point. In such case, the controller 62 would not be present. Another possibility is an oxygen injection device in which the motor speed is controllable and reacts to the oxygen control signal to increase or decrease the speed of the motor.

As would be understood by those skilled in the art, while the present invention has been described in reference to preferred embodiments, numbers changes, modifications and omissions thereof could be made without departing from the spirit and scope of the present invention as set forth in the appended claims.

I claim:

1. A method of controlling dissolved oxygen levels in a secondary treatment system of a wastewater treatment facility to prevent bulking and minimize generation of extra cellular polymeric substances, said method comprising:
   introducing oxygen into mixed liquor contained in the aeration basin of the secondary treatment system to support bacterial activity within the aeration basin provided in part by return activated sludge;
   measuring a dissolved oxygen concentration within the mixed liquor with an oxygen sensor having a response time equal to a time delay between measurement of the dissolved oxygen and a change in the oxygen injection rate;
   multiplying an oxygen uptake rate at which the oxygen is consumed in the mixed liquor by the response time to obtain a dissolved oxygen adjustment factor;
   calculating a minimum dissolved oxygen set point by adding the dissolved oxygen adjustment factor to a minimum system dissolved oxygen concentration selected to prevent bulking and minimize generation of extra cellular polymeric substances; and
   controlling the oxygen introduction into the mixed liquor so that the dissolved oxygen concentration is no less than the minimum dissolved oxygen set point and no greater than a maximum dissolved oxygen set point that is less than a solubility limit of the dissolved oxygen within the mixed liquor.

2. The method of claim 1, wherein:
   a level of mixed liquor suspended solids is measured with a suspended solids sensor located within the aeration basin;
   the minimum system dissolved oxygen concentration is calculated from data that relates at least the level of mixed liquor suspended solids, as measured by the suspended solids sensor, to minimum system dissolved oxygen concentration values referable to inferred food to mass ratios that will prevent bulking and minimize generation of extra cellular polymeric substances; and
   the minimum system dissolved oxygen concentration is continually updated from the minimum system dissolved oxygen concentration values contained within the data and based at least upon the level of mixed liquor suspended solids as measured by the suspended solids sensor.

3. The method of claim 1 or claim 2, wherein:

a target dissolved oxygen set point is calculated from an arithmetic average of the maximum dissolved oxygen set point and the minimum dissolved oxygen set point;

when the oxygen concentration as measured by the oxygen sensor is above the target dissolved oxygen set point, the oxygen introduction into the mixed liquor is suspended, a rate of change of the dissolved oxygen concentration, as measured by the sensor, is calculated and the oxygen uptake rate is set equal to the rate of change of the dissolved oxygen concentration; and when the oxygen concentration as measured by the oxygen sensor is below the target dissolved oxygen set point, the oxygen introduction into the mixed liquor is controlled so that the oxygen concentration as measured by the oxygen sensor at least approaches the target dissolved oxygen set point.

4. The method of claim 3, wherein:

the secondary treatment system has a membrane bioreactor;

an effluent stream from the aeration basin is introduced into a membrane bioreactor to separate a solid content therefrom and thereby to produce a retentate and a permeate stream; and the return activated sludge is produced by introducing the retentate stream from the membrane bioreactor to the aeration basin; and the prevention of bulking and minimization of the generation of extra cellular polymeric substances in turn prevents fouling of membranes within the membrane bioreactor.

5. The method of claim 4, wherein the oxygen is introduced into the mixed liquor by introducing an oxygen stream into a headspace of a ballast chamber of mixing device having a draft tube connected to the ballast chamber and an impeller driven within the draft tube to draw the mixed liquor into one end of the draft tube along with the oxygen and to expel a resulting liquid gas mixture from the other end of the draft tube; and the oxygen injection is controlled by a remotely activated valve situated between the headspace of the mixing device and a source of the oxygen stream.

6. The method of claim 3, wherein the maximum dissolved oxygen set point is calculated by adding to the minimum dissolved oxygen set point, a preselected dissolved oxygen value of between 1.0 and 5.0 milligrams/liter dissolved oxygen.

7. A system for controlling dissolved oxygen levels in a secondary treatment system of a waste water treatment facility to prevent bulking and generation of extra cellular polymeric substances, said system comprising:

the secondary treatment system having an aeration basin containing a mixed liquor, means for introducing oxygen into the mixed liquor, the oxygen introducing means responsive to an oxygen control signal to control the introduction of the oxygen into the mixed liquor and means for providing return activated sludge to the mixed liquor;

an oxygen sensor located within the mixed liquor for generating a dissolved oxygen signal referable to a dissolved oxygen concentration within the mixed liquor, the oxygen sensor having a response time equal to a time delay between measurement of the dissolved oxygen and a change in the oxygen injection rate; and a controller responsive to the dissolved oxygen level signal, configured to generate the oxygen control signal and having a control program, programmed to periodically execute;

the control program, during each execution, programmed to:

multiply an oxygen uptake rate at which the oxygen is consumed in the mixed liquor by the response time to obtain a dissolved oxygen adjustment factor;

calculate a minimum dissolved oxygen set point by adding the dissolved oxygen adjustment factor to a minimum system dissolved oxygen concentration selected to prevent bulking and minimize generation of extra cellular polymeric substances; and generate the oxygen control signal and thereby control the oxygen injection so that the dissolved oxygen concentration as measured by the oxygen sensor is no less than the minimum dissolved oxygen set point and no greater than a maximum dissolved oxygen set point that is less than a solubility limit of the dissolved oxygen within the mixed liquor.

8. The system of claim 7, wherein:

a suspended solids sensor is located within the aeration basin and configured to generate a suspended solids signal referable to a level of mixed liquor suspended solids;

the controller is responsive to the suspended solids signal;

the control program contains data that relates at least the level of mixed liquor suspended solids, as measured by the suspended solids sensor, to minimum system dissolved oxygen concentration values referable to inferred food to mass ratios that will prevent bulking and minimize generation of extra cellular polymeric substances; and during each execution of the control program, the control program determines the minimum system dissolved oxygen concentration from the minimum system dissolved oxygen concentration values contained in the data based at least upon the level of mixed liquor suspended solids as measured by the suspended solids sensor.

9. The system of claim 7 or claim 8, wherein:

the oxygen introducing means is an oxygen introduction device configured to inject oxygen into the mixed liquor, a remotely activated control valve positioned between a source of the oxygen and the oxygen introduction device and a local controller responsive to the oxygen control signal and the dissolved oxygen signal;

the local controller configured to control a degree to which the remotely activated valve is opened and the flow of the oxygen so that the oxygen concentration as measured by the oxygen sensor at least approaches a target dissolved oxygen set point or alternatively, to close the control valve and suspend delivery of the oxygen to the mixed liquor; and the control program is also programmed to:

calculate the target dissolved oxygen set point from an arithmetic average of the maximum dissolved oxygen set point and the minimum dissolved oxygen set point;

compare the target dissolved oxygen set point with the dissolved oxygen concentration as measured by the oxygen sensor;

when the dissolved oxygen concentration as measured by the oxygen sensor is greater than the target dissolved oxygen set point: generate the oxygen control signal so that the local controller closes the control valve; store values of the dissolved oxygen concentration; calculate a rate of change in the dissolved oxygen concentration between a current value of the dissolved oxygen concentration and a past value of the dissolved oxygen concentration as measured by the oxygen sensor; and set the oxygen uptake rate variable equal to the rate of change; and when the dissolved oxygen concentration oxygen concentration as measured by the oxygen sensor is less than the target dissolved oxygen set point, generate the oxygen control signal to be referable to the target dissolved oxygen set point so that the oxygen concentration as measured by the oxygen sensor at least approaches the target dissolved oxygen set point.

10. The system of claim 9, wherein:

the return activated sludge means is a membrane bioreactor connected to the aeration basin to receive an effluent stream from the aeration basin and thereby to separate the solid content therefrom as a retentate and a recycle line connecting the membrane bioreactor to the aeration basin so that a return activated sludge stream is returned to the aeration basin as the return activated sludge; and the prevention of bulking and minimization of the generation of extra cellular polymeric substances in turn prevents fouling of membranes within the membrane bioreactor.

11. The system of claim 10, wherein the oxygen injection device has a headspace located within of a ballast chamber, a draft tube connected to the ballast chamber, an impeller located in the draft tube and a motor connected to the impeller to drive the motor so that the mixed liquor is drawn into one end of the draft tube along with the oxygen from the headspace and a resulting liquid gas mixture is discharged from the other end of the draft tube; and the remotely activated valve is situated between the headspace of the mixing device and a source of the oxygen stream to control flow of oxygen introduced into the headspace of the mixing device.

12. The system of claim 9, wherein the control program calculates the maximum dissolved oxygen set point by adding to the minimum dissolved oxygen set point a preselected dissolved oxygen concentration valve of between 1.0 and 5.0 milligrams/liter dissolved oxygen.

* * * * *